(12) United States Patent
Ryu et al.

(10) Patent No.: US 9,880,524 B2
(45) Date of Patent: Jan. 30, 2018

(54) WATCH TYPE MOBILE TERMINAL AND CONTROLLING METHOD THEREOF

(71) Applicant: LG ELECTRONICS INC., Seoul (KR)

(72) Inventors: Grami Ryu, Seoul (KR); Mijun Yoo, Seoul (KR); Yongdeok Lee, Seoul (KR); Yoojin Kang, Seoul (KR); Junghoon Lee, Seoul (KR); Taeryung Rhee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 14/975,350

(22) Filed: Dec. 18, 2015

(65) Prior Publication Data

US 2017/0075305 A1 Mar. 16, 2017

(30) Foreign Application Priority Data

Sep. 16, 2015 (KR) .................... 10-2015-0130896

(51) Int. Cl.
*G04G 9/00* (2006.01)
*G04G 21/00* (2010.01)
(Continued)

(52) U.S. Cl.
CPC ......... *G04G 9/0064* (2013.01); *G04G 9/0082* (2013.01); *G04G 21/00* (2013.01);
(Continued)

(58) Field of Classification Search
CPC ........ G04B 19/04; G04G 9/00; G04G 9/0064; G04G 21/00; G04G 9/0082; G06F 1/163; G06F 3/048; G08B 5/228
See application file for complete search history.

(56) References Cited

U.S. PATENT DOCUMENTS

| | | | | |
|---|---|---|---|---|
| 4,866,684 A | * | 9/1989 | Besson | ................ G04B 19/082 368/108 |
| 5,329,501 A | * | 7/1994 | Meister | .................. G04G 21/04 340/7.53 |

(Continued)

FOREIGN PATENT DOCUMENTS

| | | |
|---|---|---|
| EP | 1956446 | 8/2008 |
| EP | 2838008 | 2/2015 |
| EP | 2899952 | 7/2015 |

OTHER PUBLICATIONS

European Patent Office Application Serial No. 16000108.7, Search Report dated Jan. 3, 2017, 21 pages.

(Continued)

*Primary Examiner* — Sean Kayes
(74) *Attorney, Agent, or Firm* — Lee, Hong, Degerman, Kang & Waimey

(57) ABSTRACT

A watch type mobile terminal and controlling method thereof are disclosed, by which a position of an hour hand and a position of a minute hand can be automatically changed to prevent an object contained in an application running screen from being blocked. A watch type mobile terminal in which time is indicated by at least one hand, the mobile terminal comprising: a display; and a controller configured to: cause the display to display a face screen; cause the at least one hand to point to a current time while the face screen is displayed; cause the display to display an execution screen of an application when the application is executed; and cause the at least one hand to move from a first position to a second position, deviating from the current time, to not block an area of the execution screen at which an object is displayed.

19 Claims, 14 Drawing Sheets

(51) Int. Cl.
*G06F 1/16* (2006.01)
*G06F 3/048* (2013.01)
*G08B 5/22* (2006.01)

(52) U.S. Cl.
CPC .............. *G06F 1/163* (2013.01); *G06F 3/048* (2013.01); *G08B 5/228* (2013.01)

(56) References Cited

U.S. PATENT DOCUMENTS

| | | |
|---|---|---|
| 5,475,653 A | 12/1995 | Yamada et al. |
| 5,528,559 A | 6/1996 | Lucas |
| 5,892,455 A | 4/1999 | Matsumoto |
| 9,348,320 B1 * | 5/2016 | Defazio .................. G04G 11/00 |
| 2009/0005080 A1 | 1/2009 | Forstall et al. |
| 2009/0024943 A1 * | 1/2009 | Adler ................... G04G 13/021 |
| | | 715/764 |
| 2011/0157046 A1 | 6/2011 | Lee et al. |
| 2012/0324390 A1 | 12/2012 | Tao |
| 2015/0355830 A1 * | 12/2015 | Chaudhri .............. G06F 3/0481 |
| | | 715/738 |
| 2016/0054710 A1 * | 2/2016 | Jo .......................... G04G 21/00 |
| | | 715/763 |

OTHER PUBLICATIONS

European Patent Application No. 16000108.7, Search Report dated Sep. 30, 2016, 7 pages.

\* cited by examiner

WATCH TYPE MOBILE TERMINAL AND CONTROLLING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0130896, filed on Sep. 16, 2015, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for automatically changing a position of an hour hand and a position of a minute hand to prevent an object contained in an application execution screen from being blocked.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like for example.

To further increase portability of a mobile terminal, many ongoing efforts are mode to research and develop a mobile terminal of a type wearable on a wrist like a watch. Unlike the typical mobile terminals, a mobile terminal of a wearable type is advantageous in being always carried on a user's body. It is inconvenient for a user to take out a mobile terminal of a traditional bar or folder type from a pocket or bag if necessary. Yet, since a wearable device can be always carried on a user's body, it is advantageous in that the user can check contents of the mobile terminal at any time.

As one of wearable devices, a watch type terminal may play a role in informing a user of a time as well. According to a generally used method, in order to indicate a time, an hour hand and a minute hand are displayed on a clock face.

However, the hour and minute hands may block a display unit. For instance, when an application execution screen is outputted through the display unit, if the hour and minute hands keep indicating a current time, it may cause a problem that the hour and minute hands block a portion of the application execution screen.

SUMMARY OF THE INVENTION

Accordingly, embodiments of the present invention are directed to a mobile terminal and controlling method thereof that substantially obviate one or more problems due to limitations and disadvantages of the related art.

The present invention is devised for the aforementioned necessity, and an object of the present invention is to provide a mobile terminal and controlling method thereof, by which user's convenience is enhanced.

In particular, one object of the present invention is to provide a mobile terminal and controlling method thereof, by which an hour hand and a minute hand can be rearranged to prevent the hour and minute hands from blocking an object contained in an application execution screen.

Another object of the present invention is to provide a mobile terminal and controlling method thereof, by which a progressive status of a prescribed item can be represented using an hour hand and a minute hand.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, as embodied and broadly described herein, a watch type mobile terminal in which time is indicated by at least one hand, the mobile terminal comprising: a display; and a controller configured to: cause the display to display a face screen; cause the at least one hand to point to a current time while the face screen is displayed; cause the display to display an execution screen of an application when the application is executed; and cause the at least one hand to move from a first position to a second position, deviating from the current time, to not block an area of the execution screen at which an object is displayed.

In another aspect of the present invention, as embodied and broadly described herein, a method for controlling a watch type mobile terminal in which time is indicated by at least one hand, the method comprising: displaying a face screen; causing the at least one hand to point to a current time while the face screen is displayed; executing an application and displaying an execution screen of the executed application; and moving the at least one hand from a first position to a second position, deviating from the current time, to not block an area of the execution screen at which an object is displayed Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
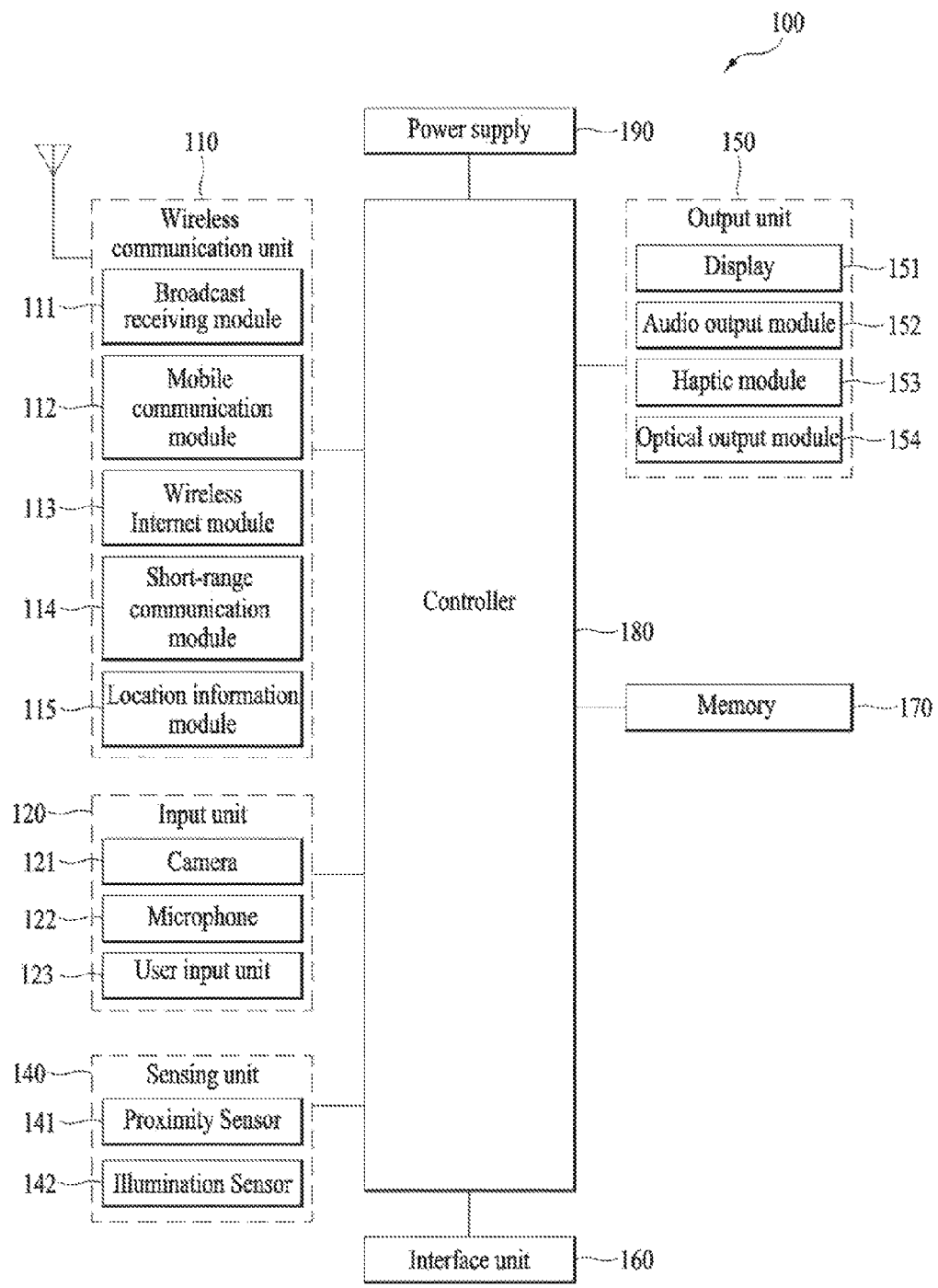
FIG. 1A is a block diagram of a mobile terminal in accordance with the present disclosure.
Figure 1B:
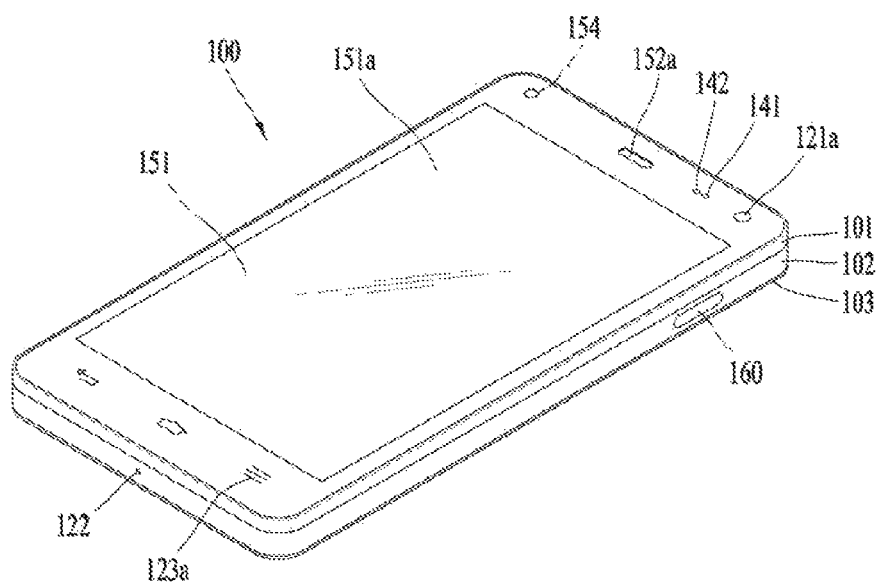
FIGS. 1B and 1C are conceptual views of one example of the mobile terminal, viewed from different directions.
Figure 1C:
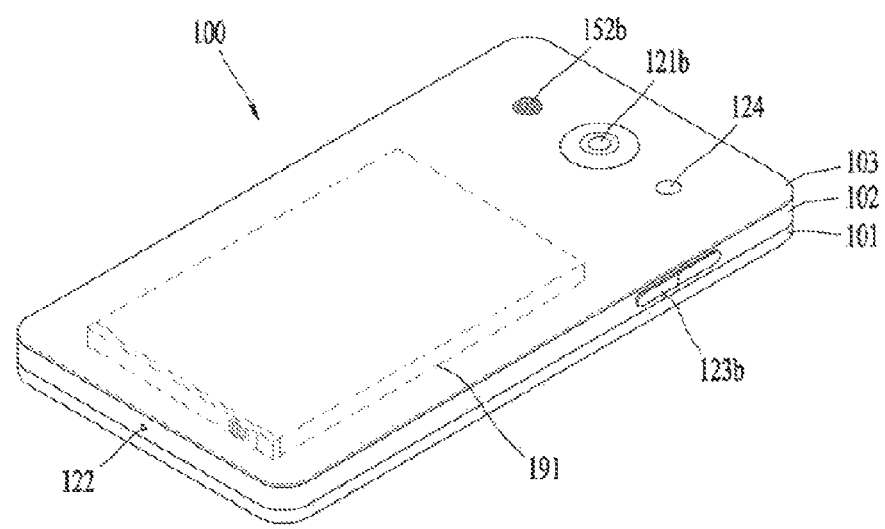

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
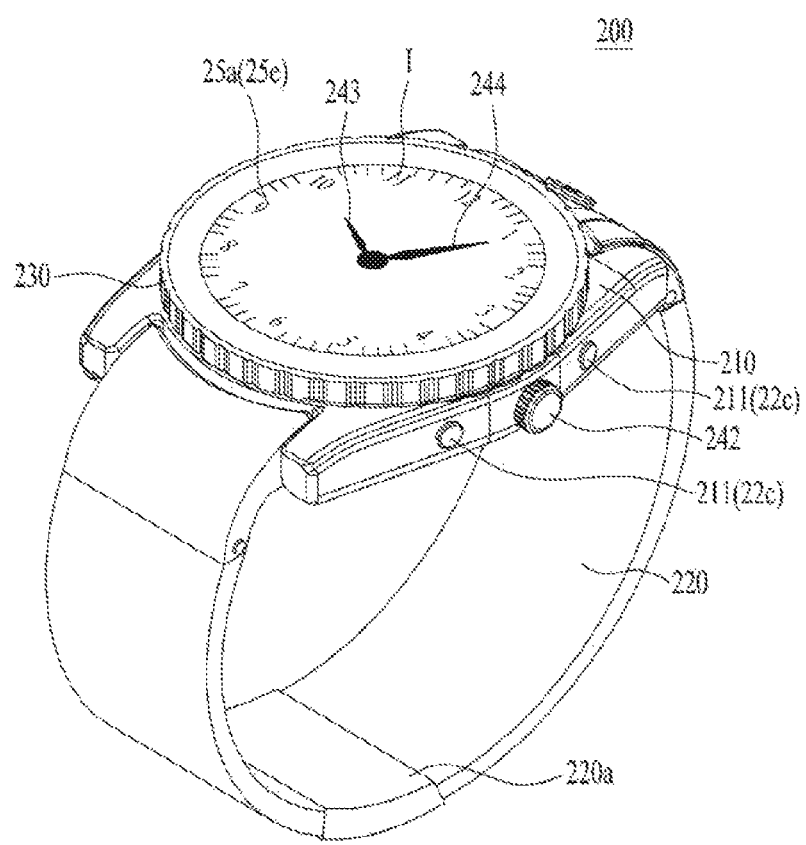
FIG. 2 is a perspective diagram of a watch type terminal according to one example of the present application.
Figure 3:
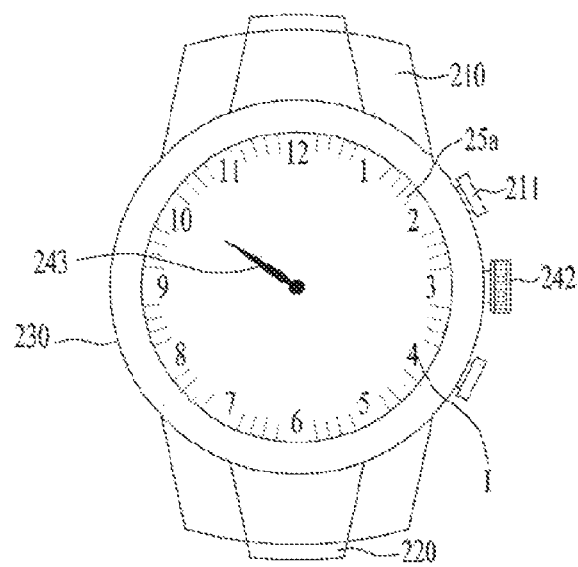
FIG. 3 is a front diagram for one example of a single physical hand in a watch type terminal.
Figure 4:
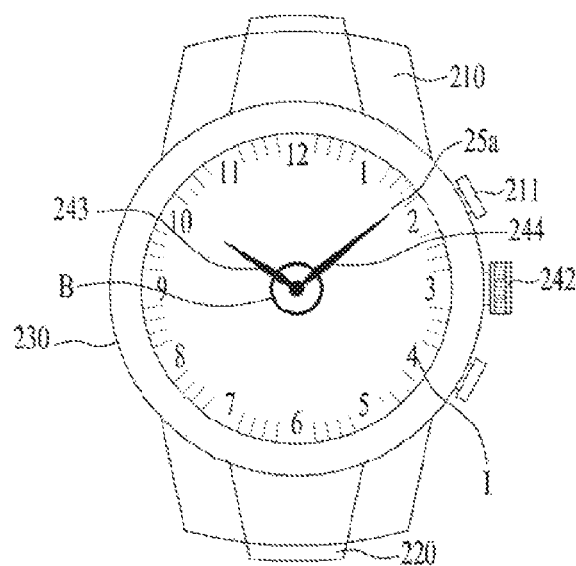
FIG. 4 is a front diagram for one example of a plurality of physical hands in a watch type terminal.
Figure 5:
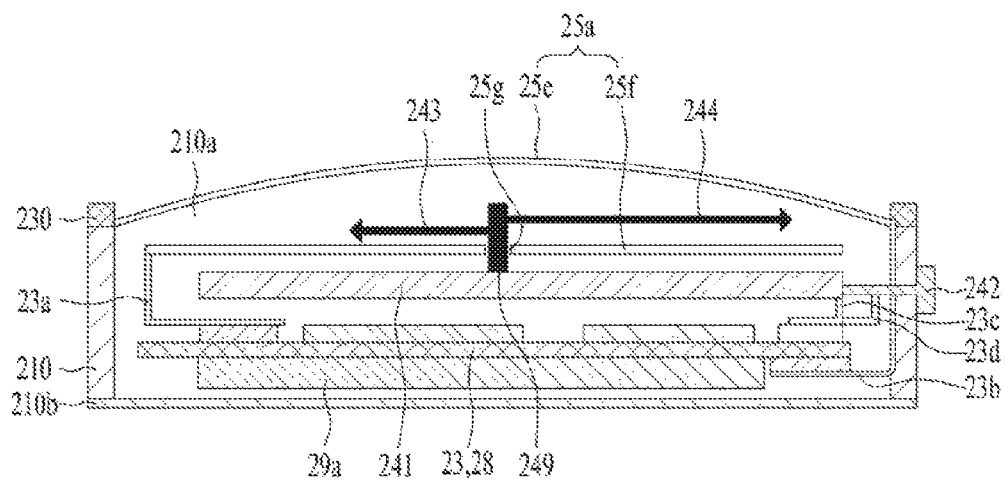
FIG. 5 and FIG. 6 are cross-sectional diagrams of a watch type terminal.
Figure 6:
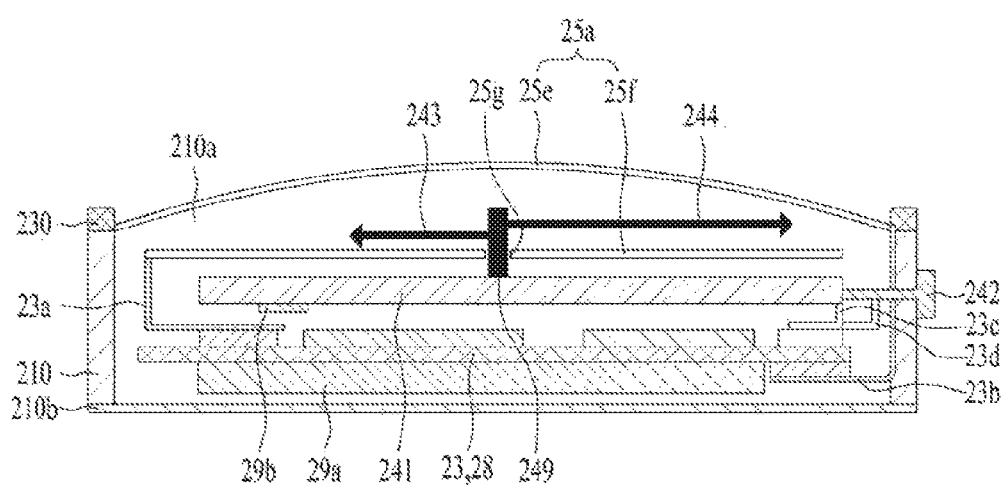

A mobile terminal may have a watch type configuration. In continuation with the general configuration of the mobile terminal mentioned in the foregoing description, a structure of a watch type terminal shall be described with reference to the accompanying drawings. Regarding this, FIG. 2 is a perspective diagram of a watch type terminal according to one example of the present application, FIG. 3 is a front diagram for one example of a single physical hand in a watch type terminal, FIG. 4 is a front diagram for one example of a plurality of physical hands in a watch type terminal, and FIG. 5 and FIG. 6 are cross-sectional diagrams of a watch type terminal. Since FIG. 2 shows an overall structure of a watch type terminal 200, all the following descriptions may basically refer to FIG. 2 unless a specific drawing is mentioned to be referred to.

First of all, a watch type terminal 200 may include a case 210 configuring a body of the watch type terminal 200. Referring to FIG. 5 and FIG. 6, the case 210 can have an inner space in a prescribed size configured to accommodate various parts therein. And, the case 210 may have an opening 210a configured to communicate with the inner space to install the parts in the inner space. The case 210 may be configured with a single member overall. Yet, as shown in the drawings, the case 210 may have a case back 210b configured to be detachably coupled. Through the separable case back 210b, the internal parts accommodated in the case 210 can be easily accessed. Although the case 210 shown in the drawings has a circular shape overall, it may have one of various shapes such as a rectangle and the like.

The watch type terminal 200 may include a bezel 230 disposed on the case 210. The bezel 230 is configured with a member of a ring type and is extensible along an edge of the case 210. In particular, the bezel 230 may be configured to enclose the opening 210a of the case 210. Hence, the bezel 230 encloses a display unit 25a disposed in the opening 210a to protect the display unit 25a, which will be described in detail later. Moreover, the bezel 230 can hold a separate glass or crystal member configured to protect the display unit 25a. A window 25e of the display unit 25a mentioned in the following description may correspond to the glass or crystal member. In addition to the protective purpose, the bezel 230 may be configured to provide other functions and may also be used for a decorative purpose.

In aspect of functionality, the case 210 may be basically configured to support various electronic and mechanical parts required for the operations of the watch type terminal 200. Since FIG. 5 and FIG. 6 illustrate the inner configuration of the watch type terminal 200 so well, inner parts of the watch type terminal 200 are described in detail with reference to these drawings as follows.

First of all, the watch type terminal 200 may include the display unit 25a as an output unit 25. The display unit 25a may be exposed from the watch type terminal 200 in order to be shown well to a user currently wearing the watch type terminal 200. The display unit 25a is basically disposed within the case 210 and may be exposed to the user through the opening 210a of the case 210. And, the display unit 25a may be able to display information processed by the watch type terminal 200. For instance, the display unit 25a basically outputs various images and various text informations and is able to display execution screen information of an application program run in the watch type terminal 200 or a UI (user interface) and/or a GUI (graphic user interface) according to the execution screen information. Moreover, a watch face screen configured to inform a user of a current time may be outputted through the display unit 25a.

The watch face screen may include numerals corresponding to a current time or a clockface (e.g., a dial, a face, etc.) like an analog clock. Through the watch face, an electronic and virtual watch can be embodied in the watch type terminal 200.

The display unit 25a may include a display module 25f and a window 25e configured to cover the display module 25f. The display module 25f may include such a display device as LCD, OLED or the like mentioned in the foregoing description and is the component for displaying image information actually. The window 25e may be disposed on a portion of the display module 25f exposed to a user and is able to protect from the display module 25 externally. In addition to such a protective function, the window 25e should allow information displayed on the display module 25f to be shown to a user therethrough. Hence, the window 25e may be formed of material having proper strength and transparency. In particular, the window 25e may play a role as a glass or crystal member of a normal watch. The window 25e, as shown in FIG. 5 and FIG. 6, can be separated or detached from the display module 25f In this case, as shown in the drawings, the bezel 230 may be configured to hold or catch the window 25e.

In order to receive a control command by a touch mechanism, the display unit 25a may include a touch sensor configured to sense a touch to the display unit 25a. using this, if a touch is applied to the display unit 25a, the touch sensor senses the corresponding touch and is then able to generate a control command corresponding to the touch based on the sensed touch. Contents inputted by the touch mechanism may include texts, numerals, menu items indicated or designated in various modes, and the like. The touch sensor is configured with a film having a touch pattern and may be disposed between the window 25e and the display module 25f. Alternatively, the touch sensor may include a metal wire directly patterned on a backside of the window 25e. If the window 25e is separated or detached from the display module 25f, as shown in FIG. 5 and FIG. 6, the touch sensor 25e may be built in one body of the window 25e. Thus, the display unit 25a can configure a touchscreen together with the touch sensor. In this case, the touchscreen may play a role as a user input unit. If necessary, a physical key (e.g., a push key) can be additionally provided as a user input unit to a spot adjacent to the display unit 25a (i.e., touchscreen) for facilitating a user's input. Looking into the watch type terminal 200 shown in FIG. 5 and FIG. 6, the window 25e is disposed in a manner of being spaced apart from the display module 25f and plays a role in protecting inner parts of the watch type terminal 200 like the glass or crystal of a normal watch. On the other hand, the display module 25f still performs a function of displaying information, which is the unique function of the display unit 25a. Thus, in case that the window 25e and the display module 25f are separated from each other and perform functions distinguished from each other, the window 25e may be regarded as a part separated from the display unit 25a structurally and functionally. Therefore, in the following description, it will be appreciated that the display unit 25a substantially means the display module 25f only.

A circuit board 23 is the component on which various electronic parts, and more particularly, processors configuring a control unit 28 are mounted together with other circuits and devices supporting them and may be installed in the case 210. Besides, the respective components shown in FIG. 1 may be directly installed on the circuit board 23 to be controlled by the control unit 28 or may be electrically connected to the circuit board 23 by being installed in the case 210 [not shown in the drawing in detail]. For instance, as shown in FIG. 5 and FIG. 6, the window 25e (i.e., touch sensor) and the display module 25f can be connected to the circuit board 23 through wirings 23b and 23a, respectively. In particular, the control unit 28 can receive a command by a touch from the touch sensor of the window 25e via the wiring 23a and is able to control various parts including the display module 25f based on the received command. Hence, the control unit 28 can be called one of various names such as a controller, a controlling device and the like and is able to control the watch type terminal 200 and all the components of the watch type terminal 200. Such controllable components include not only the components shown in FIG. 1A but also other components mentioned in the following description. This is why the control unit 28 can become a substantial component for appropriately performing a controlling method according to the present application by controlling operations of other components.

Moreover, the watch type terminal 200 may further include a battery 29a as a power supply unit configured to supply power. The battery 29a may be installed in the case 210 stationarily or detachably. And, the battery 29a can be charged via a power cable connected to the watch type terminal 200. Moreover, the battery 29a may be configured to enable the wireless charging through a wireless charging device. In this case, the wireless charging may be embodied by magnetic induction or resonance (e.g., magnetic resonance).

In addition to the digital device (e.g., mobile terminal, smart device, etc.) provided by the various electronic parts mentioned in the foregoing description, the watch type terminal 200 may further include components as an analog device. In particular, the watch type terminal 200 may be configured to actually display a current time using physical hands. And, such a time display may be performed by a physical watch unit.

The watch type terminal 200 may include a movement 241 as the physical watch unit. The movement 241 can be located in the case 210, which is shown well in FIG. 5 and FIG. 6. The movement 241 may be configured to move physical hands 244 and 145, which are described in the following, to display a current time. In particular, the movement 241 includes a multitude of small parts such as gears, springs and the like to move the hands 244 and 145 connected to the movement 241. And, these parts are accommodated in a separate housing. In more particular, the movement 241 can be installed as a module in the case 210.

The watch type terminal 200 may include at least one hand 244 and 243 as the physical watch unit. The hand 244 and 243 may include a physical member, and more particularly, a member in a needle shape. Like the normal analog watch, the hand 244 and 243 is disposed at the center of the case 210. As mentioned in the foregoing description, an inner circumference of the case 210 forms the opening 210a of the case 210. The display unit 25a, and more particularly, the display module 25f is inserted in the case 210 through the opening 210a and may have a size approximately corresponding to a size of the opening 210a. Hence, the hand 244 and 243 is disposed at the center of the case 210 and can be also disposed at the center of the display unit 25a, and more particularly, at the center of the display module 25f. On the other hand, if necessary, the hand 244 and 243 can be disposed at a different location other than the center of the case 210 or the display unit 25a. Moreover, like the normal analog watch, the hand 244 and 243 may extend from a central portion of the case 210 or the display unit 25a toward an outside in a radial direction.

Like the normal analog watch, the hand 244 and 243 can display a current time for a user by indicating a letter or scale on the dial. According to the normal analog watch, a dial or a watch face is installed in a center portion of the case 210, and more particularly, in the opening 210a. In order for the hand to indicate a time, the dial or watch face includes such indexes as letters, numerals, sales and the like. Yet, according to the watch type terminal 200, the display unit 25a, and more particularly, the display module 25f plays a role as a dial on behalf of the normal dial. In particular, a watch face screen including an index I for displaying a time can be outputted through the display unit 25a. Hence, as the hands 244 and 243 point to the index I on the display unit 25a, a current time can be displayed.

Moreover, referring to FIG. 3, the watch type terminal 200 may include a single physical hand 243 only to display a current time. The single hand 243 may be configured to simply point to a time only without displaying a minute. Yet, the single hand 243 may be configured to point to both an hour and a minute. In particular, as shown in FIG. 3, an interval between indexes indicating one hour may be divided into a multitude of scales. And, the single hand 243 may point to an hour and a minute while moving from one index to another nearby index. For instance, if a space between the index 1 and the index 2 is divided into 12 scales, a single scale can indicate a time interval of 5 minutes between 1 o'clock and 2 o'clock. Hence, the single hand 243 can simultaneously point to the time of 1 o'clock and a corresponding minute by gradually moving from the index 1 to the index 2. Moreover, referring to other drawings (particularly, FIG. 4) except FIG. 3, the watch type terminal 200 can include a plurality of hands 243 and 244. A plurality of the hands 243 and 244 may become an hour hand indicating an hour and a minute hand indicating a minute, respectively. In particular, the minute hand 244 may be formed longer than the hour hand 243 to be distinguished among the hands. Except the length difference, the minute hand 244 has no differences from the hour hand 243 in disposition, extending direction, and the like. The watch type terminal 200 may further include a second hand indicating a second in addition to the hour and minute hands 243 and 244. And, the second hand may have the same structural features of the hour and minute hands 243 and 244 mentioned in the foregoing description.

In order to move, as shown in FIG. 5 and FIG. 6, the hands 243 and 244 can be mechanically connected to the movement 241. For instance, the hands 243 and 244 can be connected to the inner mechanical parts of the movement 241 using such a connecting member 249 as a shaft, a rod or the like. By rotating the connecting member 249, the movement 241 can gradually rotate the hands 243 and 244 connected thereto, whereby the hands 243 and 244 can point to a corresponding index of the bezel 230 to accurately display a current time. Meanwhile, for the purpose of correction of time error or other purposes, it is necessary for the hands 243 and 244 to be adjusted by a user. Hence, the watch type terminal 200 may include a crown 242 as a part of the physical watch unit 240. The crown 242 is provided to a lateral portion of the case 210 and is operably connected to the movement 241 through the case 210. In particular, the crown 242 is rotatably connected to the movement 241. As the crown 242 is rotated, the hands 243 and 244 can be moved. Therefore, using the crown 242, the hands 243 and 244 can be adjusted to point to the accurate time. By rotating the crown 242, the hands 243 and 244 can be adjusted or rotated to provide functions different from the watch function. On the other hand, the watch type terminal 200 may include a push button 211 as an input unit 22c. For example, as shown in FIG. 2, the push button 211 can be disposed on the lateral portion of the case 210 to be adjacent to the crown 242. For example, the push button 211 may be installed in the circuit board 23 or may contact with a switch electrically connected to the circuit board 23. Hence, as the push button 211 is pushed, a prescribed electrical signal is applied to the circuit board 23 and the control unit 28, whereby a function of the mobile terminal can be given to the corresponding electronic parts.

The movement 241 can operate in various ways to move the hands 243 and 244. For instance, the movement 241 may be categorized into a mechanical movement or a quartz movement. The mechanical movement can drive the inner parts and the hands 243 and 244 using the mechanical energy saved in a watch spring only. In order to wind up a watch spring, the crown 242 can be rotated. On the other hand, the watch spring may be automatically wound up by a user's motion. Meanwhile, the electronic movement basically uses mechanical parts but requires a battery to supply a power to the quartz and the stepping motor configured to drive the mechanical parts.

Meanwhile, the hand 243 and 244 may be used to provide a function of a smart device as well as to simply display a time. Yet, in order to provide such a function, the hand 243 and 244 should be able to operate by interworking with other electronic parts. In particular, the hand 243 and 244 should be controlled electrically and/or electronically. In more particular, the hand 243 and 244, and more specifically, a motion of the hand 243 and 244 should be moved by the electrical and electronic signals given by the control unit 28. Hence, the hand 243 and 244 can be controlled based on the electro-mechanic system. According to the definitions and principles of the general electro-mechanic system, an electrical control of a mechanical part of the watch type terminal 200 and an electric signal for the same should be understood as encompassing 'electronic control' and 'electronic signal'. For clarity of the following description of mechanical parts, an electronic control and signal or an electronic control only is mentioned. Yet, such mentioning may include an electrical control and signal. Furthermore, it may be appreciated that the electro-mechanic control is applicable to all mechanical parts of the watch type terminal 200 including the movement 241 as well as to the hand 243 and 244.

Particularly, since an operation of the hand 243 and 244 can be controlled by the movement 241, it is necessary to electronically control the movement 241 in order to control the hand 243 and 244 electronically. This is why the watch type terminal 200 can include the movement 241 consisting of the quartz movement. As mentioned in the foregoing description, since the quartz movement uses an electric motor for the hand 243 and 244, a control of the electric motor can be performed electronically. In particular, by controlling the electric motor using an electrical signal, the movement 241 and the hand 243 and 244 can be controlled. For such controls, as shown in FIG. 5 and FIG. 6, the movement 241 can be connected to the circuit board 23 and the control unit 28 through the wiring 23c. Hence, the control unit 28 controls the movement 241, thereby controlling the hand 243 and 244 as well. Moreover, as mentioned in the foregoing description, since the touch sensor of the window 25e is connected to the control unit 28, the hand 243 and 244 can be substantially controlled. In particular, all the user's finger motions of touching the window 25e are sensed through the touch sensor and are then forwarded to the control unit 28. Based on the sensed touch, the control unit 28 can control an operation of the hand 243 and 244 using the movement 241. For instance, a touch input of pushing or swiping the window 25e can be used for the purpose of controlling a motion of the hand 243 and 244. In particular, by a touch input, the control unit 28 can control not only an output of the display unit 25a but also the hand 243 and 244. Furthermore, in order to secure a further extended input interface, the crown 242 may be connected to the circuit board 23 and the control unit 28 through the wiring 23d. Hence, the crown 242 can control the display unit 25a via the control unit 28. In particular, all motions generated from manipulating the crown 242 are delivered as signals to the control unit 28. And, the control unit 28 can control the display unit 25a based on the inputted signals. For instance, by a manipulation of rotating or pulling/pushing the crown 242, the display unit 25a can be manipulated. Therefore, the crown 242 can control the hands 243 and 244 mechanically as well as the display unit electronically.

In case that the movement 241 consists of the quartz movement, it may share the battery 29a with the electronic parts of the watch type terminal 200. Yet, since the display unit 25a and other electronic parts require a considerable amount of power, it may be difficult to operate the watch type terminal 200 for a sufficient time with the single battery 29a. Eventually, if the electronic parts and the physical watch unit use the same battery 29a, both of the electronic device of the watch type terminal 200 and the physical watch cannot operate for a sufficient time. On the other hand, since the quartz movement 241 uses a considerably small amount of power only, although a general battery is used, an operation of the movement 241 can be guaranteed for several months to several years. Hence, it is preferable that the quartz movement 241 is configured to use a power source different from that of the display unit 25a and other electronic parts. According to this configuration, although operations of the electronic parts stop due to the shortage of a power source, the physical watch unit can keep displaying time for a user. In particular, the watch type terminal 200 can operate as an analog watch at least all the time. In case that the movement 241 uses the power source different from that of the display unit 25a or other electronic parts, as shown in FIG. 6, the watch type terminal 200 may include a first battery 29a configured to supply a power to the display unit 25a and the electronic parts and a second battery 29b configured to supply a power to the movement 241 separately from the first battery 29a.

As mentioned in the foregoing description, the watch type terminal 200 includes the electronic device configured to provide functions of a smart device and the mechanical device (i.e., the physical watch unit 240) configured to display a time analoguely. Owing to these configurations, the watch type terminal 200 can show both the physical hands 243 and 244 and the scene/contents of the display unit 25a to a user at the same time while operating. Hence, the watch type terminal 200 exposes the hands 243 and 244 and the display unit 25a to a user appropriately, thereby operating as both of the analog watch and the smart device substantially. Meanwhile, an optimal exposure to a user can be basically determined based on the dispositions of the hand 243 and 244 of the physical watch unit 240 and the display unit 25a (i.e., the electronic device).

If the display unit 25a is disposed above the hand 243 and 244, since the display unit 25a itself is non-transparent, the hand 243 and 244 is blocked by the display unit 25a so as to be invisible. Hence, in order for the hand 243 and 244 to be viewed by a user at least, as shown in FIG. 5, the display unit 25a, i.e., the display module 25f may be disposed below the hand 243 and 244. According to this disposition, the hand 243 and 244 is disposed closer to user's eyes than the display unit 25a. In particular, the hand 243 and 244 can be always exposed to user's eyes without being blocked by the display unit 25a. Hence, if the display unit 25a outputs a scene, the outputted scene and the hand 243 and 244 can be simultaneously viewed by a user at the same time. However, if the window 25e is attached to the display module 25f, a touch to the window 25e for indicating an operation may interfere with the hand 243 and 244 and the hand 243 and 244 may be externally exposed. Hence, the display module 25a is disposed below the hand 243 and 244 only, as shown in FIG. 5, and the window 25e can be disposed above the hand 243 and 244 together with the touch sensor. According such a final disposition, the watch type terminal 200 can appropriately protect the hand 243 and 244 by avoiding the interference with the touch while showing the scene and the hand to a user simultaneously.

Since the movement 241 is the component configured to drive the hand 243 and 244, it may be preferable that the movement 241 is disposed as close as possible to the hand 243 and 244 for the mechanical connection to the hand 243 and 244. Yet, since the movement 241 is structurally non-transparent as well, if the movement 241 is disposed above the hand 243 and 244 or the display unit 25a, it may block the hand 243 and 244 or the display unit 25a. Hence, the movement 241 can be disposed below the display unit 25a, i.e., the display module 25f In particular, the display unit 25a, i.e., the display module 25f may be inserted between the hand 243 and 244 and the movement 241. Eventually, the hand 243 and 244 is disposed above the display unit 25a and the movement 241 may be disposed below the display unit 25a. According to such dispositions, the hand 243 and 244 and the display unit 25a (i.e., the display module 25f) can be appropriately exposed to a user and the mechanical connection between the hand 243 and 244 and the movement 241 can be secured for the appropriate driving of the hand 243 and 244.

Meanwhile, in order to implement the function as the smart device sufficiently, the display unit 25a (i.e., the display module 25f) may preferably have a size as large as possible. Since the hand 243 and 244 and the display unit 25a are exposed to a user through the opening 210a, as shown in FIG. 5 and FIG. 6, the size of the opening 210a may become the largest size of the inner parts exposable to a user. Hence, the display unit 25a (i.e., the display module 25f) can be formed across the opening 210a overall. In particular, the display unit 25a (i.e., the display module 250 substantially closes the opening 210a. Moreover, since the movement is accommodated in the opening 210a, the display unit 25a can entirely cover the movement 241 disposed below the display unit 25a owing to such a size. In order to provide a user with a scene or content as large as possible to fit such a size, the display unit 25a may be configured to display a scene or content on a whole surface exposed to the user through the opening 210a. In particular, the display unit 25a can be configured to display a scene or content on a whole surface of the display unit 25a that closes or corresponds to the opening 210a. In more particular, the display unit 25a, i.e., the display module 25f can include pixels formed across the whole surface corresponding to the opening 210a. Hence, the scene or contents can be continuously displayed on the whole surface of the display unit 25a, which is exposed to a user or corresponds to a size of the opening 210a.

Moreover, as discussed in the foregoing description, the movement 241 is disposed below the display unit 25a. And, the display unit 25a can cover the movement 241 overall to have a possibly large size and a large scene corresponding to the size. According to such a configuration, the display unit 25a may interrupt the connection between the movement 241 and the hand 243 and 244 and the movement may have difficulty in being mechanically connected to the hand 243 and 244 by avoiding the display unit 25a. Hence, the movement 241 can be connected to the hand 243 and 244 by penetrating the display unit 25a, and more particularly, the display module 25f.

As mentioned in the foregoing description, due to the mutual disposition relations among the hand 243 and 244, the display unit 25a and the movement 241, the movement 241 or a portion of the movement 241 can be easily connected to the hand 243 and 244 by penetrating the display unit 25a (i.e., the display module 25f) configured to cover the movement 241. In order to allow such penetration, the display unit 25a (i.e., the display module 25f) can include a perforated hole 25g, as shown in FIG. 6. In particular, the perforated hole 25g allows a portion of the movement 241 to penetrate the display unit 25a, i.e., the display module 25f to be connected to the hand 243 and 244. The perforated hole 25g may be disposed at the center of the opening 210a or the display unit 25a (i.e., the display module 25f) or may be disposed at another location if necessary. In particular, the movement 241 may include a shaft 249 configured to rotate the hands 243 and 244. The shaft 249 is connected to various gears in the movement 241 and can rotate in accordance with a prescribed setting. The shaft 249 extends through the perforated hole 25g toward a top side of the display unit 25a, i.e., a top side of the display module 25f and can be connected to the hand 243 and 244. In consideration of a diameter of the shaft 249 and other design conditions, the perforated hole 25g may have a diameter ranging between minimum 1 mm and maximum 10 mm for example. Moreover, in addition to the perforated hole 25g, as shown in FIG. 4, a scene or content non-displayable region, i.e., a pixel not-formed region can be extended as denoted by 'B'. Such a region B can be set depending on a margin for processing the perforated hole 25g, a finishing of the processed perforated hole 25g, and other design conditions. For instance, the region B may have a diameter of 3.5 mm larger than a diameter of the perforated hole 25g.

Based on the above descriptions, the mobile terminal according to the present invention is described in detail as follows. First of all, assume that the mobile terminal according to the present invention is a watch type terminal. And, assume that the mobile terminal according to the present invention can display a time through at least one hand. Hands may include a digital image outputted through the display unit or the physical hands mentioned in the foregoing description with reference to FIGS. 2 to 6. In any cases, the hands can be controlled by the control unit. For instance, locations and shapes of the hands outputted through the display unit can be changed by the display unit output control of the control unit. A location of the physical hand can be adjusted by an electronic control of the control unit. For clarity of the following description, assume that the hands include the physical hands in the embodiments mentioned in the following description. Yet, it is a matter of course that the embodiments mentioned in the following description are applicable to a watch type terminal that displays the hands through the display unit.

For clarity of the following description, in the embodiments mentioned in the following description, assume that 2 hands including an hour hand and a minute hand are included. Although the watch type terminal is assumed as including the two hands including the hour hand and the minute hand, it is a matter of course that the embodiments mentioned in the following description are applicable to a case that a single hand is included only or a case that at least 3 hands (e.g., an hour hand, a minute hand and a second hand) are included.

The watch type terminal according to the present invention may play a role as a main device operating without a different mobile terminal's help or an auxiliary device assisting the different mobile terminal.

For instance, the watch type terminal can be used as a main device that receives a call signal, a text message and the like from a base station in direct. If a different mobile terminal receives a call signal, a text message or the like, the watch type terminal can be used as an auxiliary device that outputs information on the call signal, the text message or the like received by the different mobile terminal.

In case that the watch type terminal functions as an auxiliary device, the watch type terminal and the different mobile terminal can communicate with each other by communication schemes such as Bluetooth, NFC, Wi-Fi, Wi-Fi Direct and the like. In this case, the watch type terminal may be used as an auxiliary output device for outputting information received through the different mobile terminal or a feedback indicating that an event has occurred in the different mobile terminal or a remote control device for remotely controlling the different mobile terminal.

Moreover, in the embodiments mentioned in the following description, one example of a user input for performing a specific function is limited to a touch input, by which the present invention is non-limited. If a user input selected to perform a specific function is an input other than a proximity touch input, it may belong to the spirit or scope of the present invention. For instance, a user input for performing a specific function may include one of touch inputs such as a direct touch input of directly touching an image object, a proximity touch input of locating a pointer above an image object, a long touch input of applying a touch to an image object for prescribed duration, and the like, a physical input of manipulating a physical button (e.g., a crown), a gesture input using a watch type terminal, a voice command through a microphone, or the like. If one of the embodiments mentioned in the following description is implemented by applying a user input other than the above-listed types, it may belong to the spirit or scope of the present invention.

In the following description, the mobile terminal according to the present invention is described in detail with reference to the accompanying drawings.

Figure 7:
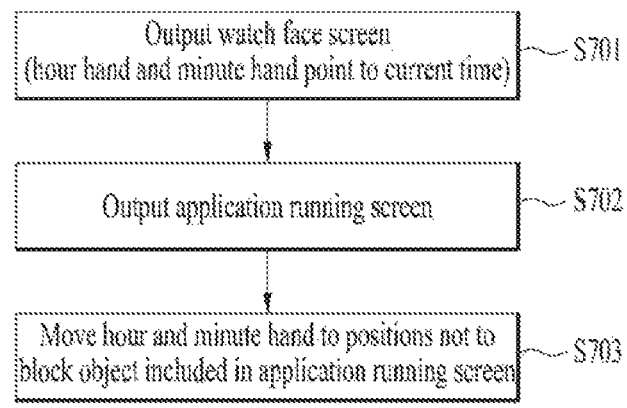
FIG. 7 is a flowchart for an operation of a mobile terminal according to one embodiment of the present invention.

FIG. 7 is a flowchart for an operation of a mobile terminal according to one embodiment of the present invention.

Referring to FIG. 7, the controller 180 can control a watch face screen (i.e., a watch face scene) to be outputted through the display unit 151 [S701]. In this case, the watch face screen may include a dial having numerals, letters or scales indicating a current time. For instance, as shown in FIG. 2, the watch face screen may include an image having the numerals and the scales between the numerals. The controller 180 can control the scales indicated on the watch face by hour and minute hands to become a current time.

The watch face screen may include a dial region and an edge region enclosing the dial region. For instance, FIG. 8 is a diagram for one example to describe a watch face screen.

Figure 8:
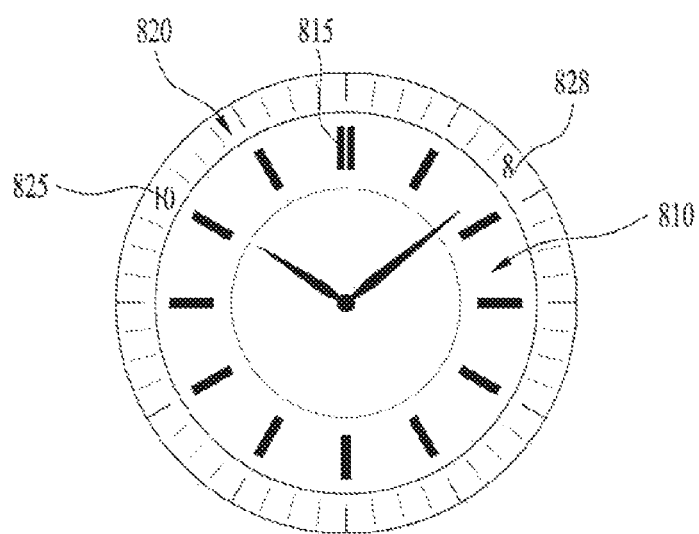
FIG. 8 is a diagram for one example to describe a watch face screen.

Referring to FIG. 8, a watch face screen may include a dial region 810 and an edge region 820 enclosing the dial region 810. Index objects 815 such as numerals, letters, symbols, images and the like can be included in the dial region 810 to identify positions ranging from 1 o'clock to 12 o'clock. According to the example shown in FIG. 8, bars for identifying positions between 1 o'clock to 12 o'clock are outputted in the dial region 810.

The scales between the index objects 815 can be outputted through at least one of the dial region 810 and the edge region 820. According to the example shown in FIG. 8, the scales are outputted through the edge region 820.

Through the edge region 820, information on a current time can be outputted. For example, the controller 180 controls an hour-unit information 825 to be displayed at the position indicated by the hour hand in the edge region 820 and is also able to control a minute-unit information 828 to be displayed at the position indicated by the minute hand. According to the example shown in FIG. 8, a numeral '10' 825 is outputted to the position indicated by the hour hand and a numeral '8' 828 is outputted to the position indicated by the minute hand. Hence, a user can be easily aware that a current time is 10:08.

In order to easily distinguish the hour-unit information 825 and the minute-unit information 820 from each other, the controller 180 can differentiate at least one of size, color and font type of the hour-unit information 825 and the minute-unit information 828. According to the example shown in FIG. 8, the numeral '10' 825 can be outputted in a size larger than that of the numeral '8' 828. This is to enable a user to recognize a current time more clearly.

Figure 9A:
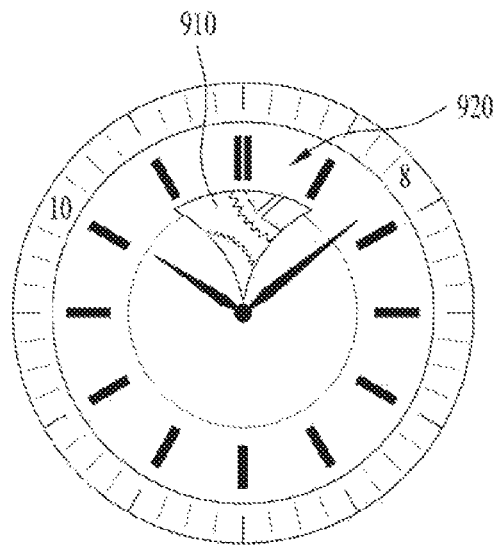
FIGS. 9A and 9B are diagrams for one example of outputting an image through a watch face screen.
Figure 9B:
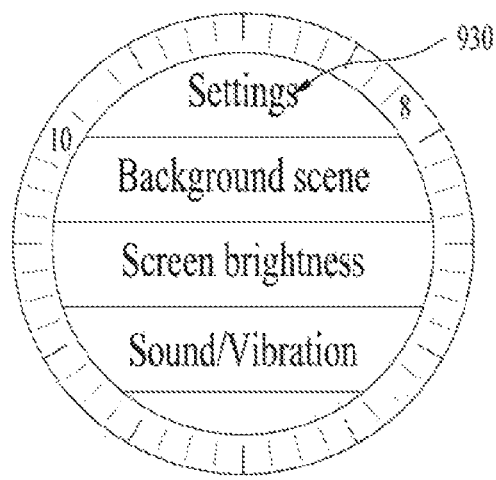

An image may be included in the dial region of the watch face screen to enhance aesthetic sensibility. For instance, FIGS. 9A and 9B are diagrams for one example of outputting an image through a watch face screen. In particular, FIG. 9A shows that an image 910 depicting an inner watch structure is included in a dial region 920. Unlike the example shown in the drawing, an image such as a character, a diagram, an icon or the like can be included in the dial region.

In this case, if a user input of touching the image 910 is received, the controller 180 can control a menu 930 linked to the image 910 to be outputted. The menu 930 linked to the image 910 may be provided to adjust the settings of the watch type terminal. According to the example shown in FIG. 9B, as a user input of touching the image is received, a setting menu 930 for adjusting the setting values of a watch face screen (e.g., a background screen), a brightness, a vibration/sound output and the like is outputted.

In a dial region of a watch face screen, a widget can be included. The widget displayed on the dial region may be provided for the purpose of simply providing information, the purpose of launching an application, the purpose of remotely controlling other devices and the like.

In this case, the controller 180 can determine a widget to display the dial region in consideration of a current time, a location of the watch type terminal, a moving speed of the watch type terminal, a communication environment of the watch type terminal, an operating mode of the watch type terminal and the like.

For instance, FIGS. 10A, 10B, 10C and 10D are diagrams for one example of changing an output of a widget in accordance with a watch type terminal placed environment.

Figure 10A:
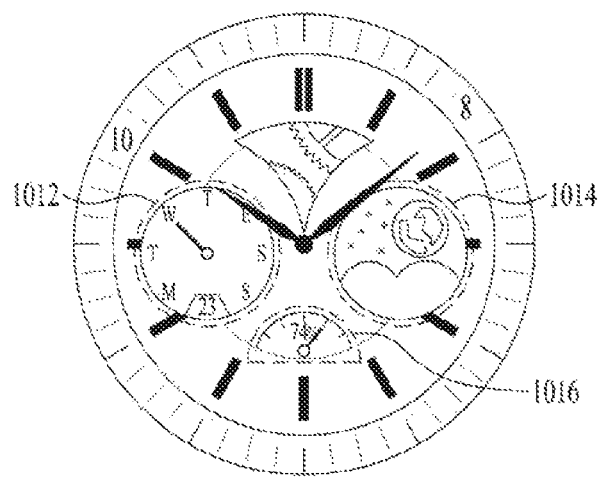
FIGS. 10A, 10B, 10C and 10D are diagrams for one example of changing an output of a widget in accordance with a watch type terminals placed environment.

Referring to FIG. 10A, if a watch type terminal is located in a pre-registered first place (e.g., a home), the controller 180 can output a widget 1012 indicating the day of the week, a moon phase widget 1014, and a widget 1016 indicating a remaining power level of a battery.

Figure 10B:
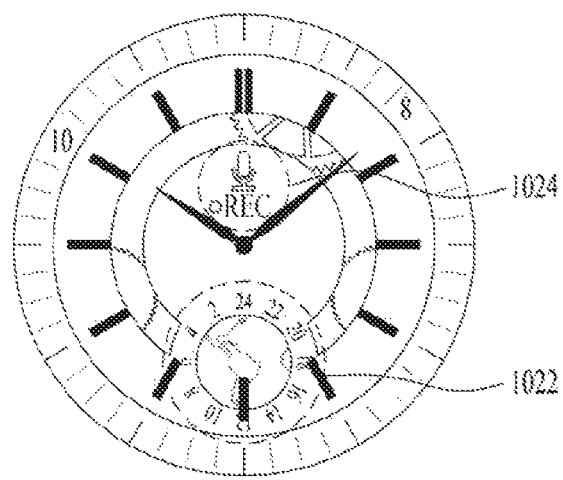

Referring to FIG. 10B, if the watch type terminal is located in a pre-registered second place (e.g., an office), the controller 180 can output a widget 1022 displaying a GMT or a local time and a widget 1024 for activating a recording function. If a user input of touching the widget 1024 for activating the recording function is received, the controller 180 activates the microphone and is then able to record a sound inputted through the microphone.

Figure 10C:
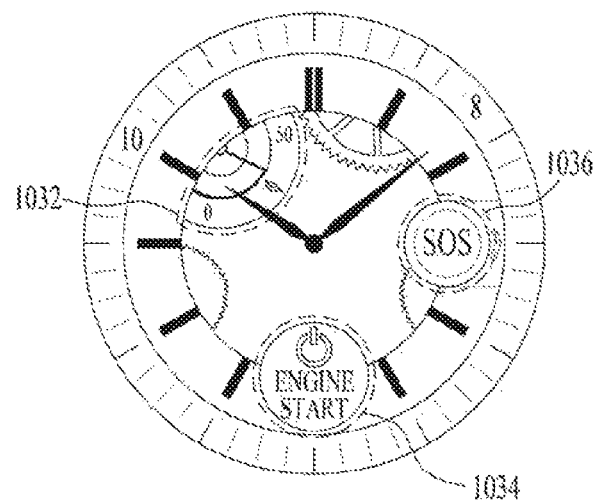

Referring to FIG. 10C, if the watch type terminal accesses a communication module in a vehicle or a mode of the watch type terminal is set to a driving mode, the controller 180 can output a widget 1032 indicating a fuel efficiency of the vehicle, a widget 1034 for starting/stopping the engine of the vehicle, and a widget 1036 for making an emergency call in case of accident occurrence.

If the watch type terminal receives an information on a vehicle fuel efficiency from the communication module in the vehicle, the controller 180 can display a fuel efficiency information of the vehicle using a hand and scales in the widget 1032.

If a user input of touching the widget 1034 for starting/stopping the engine of the vehicle is received, the controller 180 can send a control signal for ordering to start/stop the engine of the vehicle to a communication device in the vehicle. In particular, the watch type terminal can function as a remote controller configured to start/stop the engine of the vehicle remotely.

If a user input of touching the widget 1036 for making the emergency call is received, the controller 180 can make a phone call to a pre-registered phone number (e.g., 112, 119, 911, etc.). If the watch type terminal is currently interworking with a different mobile terminal, the controller 180 can send a control signal to the different mobile terminal so that the different mobile terminal makes a phone call to the pre-registered phone number.

Figure 10D:
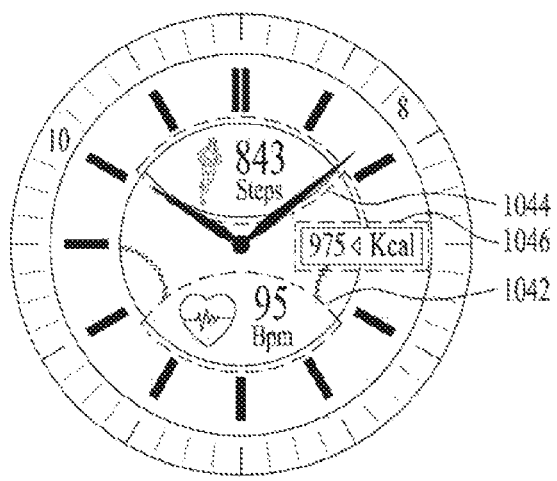

Referring to FIG. 10D, if a mode of the watch type terminal is set to an exercise mode or the watch type terminal is located at an outdoor place, the controller 180 can output a widget 1042 indicating a user's heart rate, a widget 1044 indicating the number of user's steps, and a widget 1046 indicating calorie consumption.

In order to measure the user's heart rate, a heart rate sensor may be included in the watch type terminal. Based on a signal from the heart rate sensor, the controller 180 can display the user's heart rate. Moreover, based on a mobile terminal's motion sensed by the acceleration sensor, the geomagnetic sensor and/or the like, the controller 180 can count the number of user's steps.

Like the examples shown in FIGS. 10A to 10D, the controller 180 can adjust the widgets to display through the display unit 151 in accordance with the environment in which the watch type terminal is situated. Yet, the embodiment shown in FIGS. 10A to 10D is just provided to show that the widgets outputted through the watch type terminal are changed depending on the environment having the watch type terminal situated therein, which does not mean that the widgets shown in the drawing should be outputted through the watch type terminal. It is a matter of course that widgets of types different from those shown in the drawing can be outputted. And, it is also a matter of course that widgets more or less than those shown in the drawing can be outputted.

It is a matter of course that the types of the widgets to be outputted through the display unit 151 can be adjusted by a user input. And, it is also a matter of course that a watch face screen failing to contain any widgets can be outputted.

If the watch type terminal launches an application or an application is launched in the different mobile terminal currently connected to the watch type terminal, the controller 180 can control an execution screen of the application to be outputted through the display unit 151 [S702]. In case that an application is launched in the different mobile terminal currently connected to the watch type terminal, the controller 180 may output an execution screen of the application by receiving it from the different mobile terminal.

In doing so, the controller 180 outputs the application execution screen to the dial region of the watch face screen and is also able to control the edge region to keep being outputted during the output of the application execution screen. As mentioned in the foregoing description with reference to FIG. 8, since a current time information is outputted through the edge region 820, a user can check a current time while the application execution screen is being outputted.

If the application execution screen is outputted, the controller 180 obtains positions of the objects included in the application execution screen and is then able to control the hour hand and the minute hand to move to positions not to block the objects included in the application execution screen [S703]. In this case, the objects included in the application execution screen may include a text for displaying information, an image for displaying information, a button and the like on the background image. In the following description, examples of adjusting the positions of the hour and minute hands are described in detail with reference to the accompanying drawings.

Figure 11A:
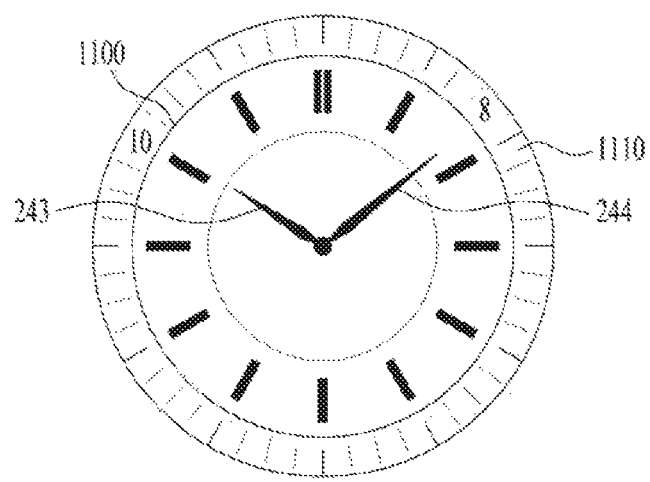
FIGS. 11A, 11B and 11C are diagrams to describe an operation of a watch type terminal in case of outputting an application execution screen.
Figure 11B:
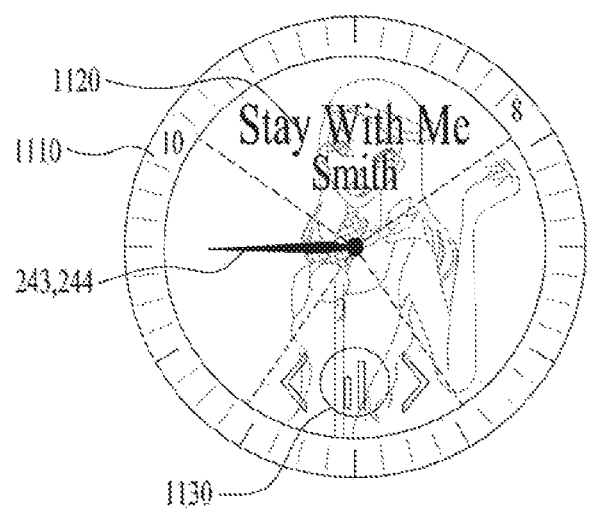
Figure 11C:
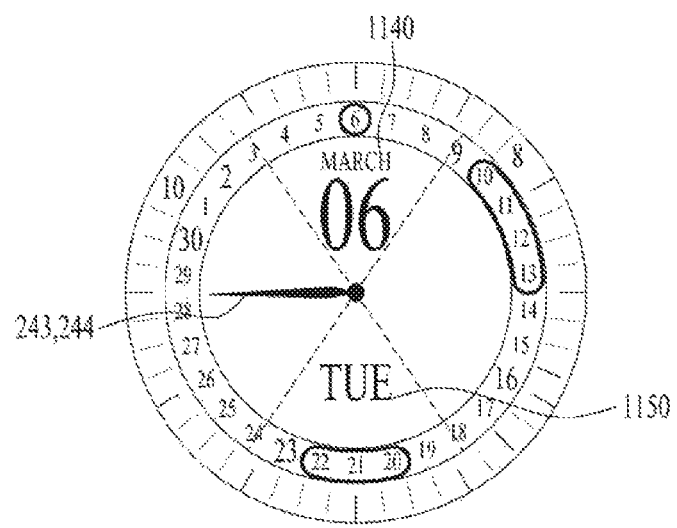

FIGS. 11A, 11B and 11C are diagrams to describe an operation of a watch type terminal in case of outputting an application execution screen.

Referring to FIG. 11A, while a watch face screen is outputted through the display unit 151 and an hour hand 243 and a minute hand 244 point to a current time, if an application is launched through the watch type terminal or a different mobile terminal currently connected to the watch type terminal, the controller 180 can control an execution screen of the application to be outputted through the display unit 151.

In doing so, the controller 180 stops an output of a dial region 1100 of the watch face screen, controls the execution screen of the application to be outputted, and is also able to control an edge region 1110 of the watch face screen to keep being outputted after outputting the execution screen of the application.

If the execution screen of the application is outputted through the display unit 151, the controller 180 can detect a position of an object included in the application execution screen.

For instance, if an execution screen of a music play application is outputted, the controller 180 can detect positions of objects included in the execution screen of the music play application. According to the example shown in FIG. 11B, a text 1120 indicating a song title and a singer name is displayed between 10 o'clock and 2 o'clock and a button 1130 for controlling a music play is displayed between 5 o'clock and 7 o'clock.

In this case, the controller 180 can move the hour hand 243 and the minute hand 244 to positions not to block the object(s) included in the application execution screen. Hence, the controller 180 can control the hour hand 243 and the minute hand 244 to be located outside the 10 to 2 o'clock region and the 5 to 7 o'clock region. In doing so, in order for the hour hand 243 and the minute hand 244 to minimize blocking the application execution screen, the controller 180 can move the hour hand 243 and the minute hand 244 to the same position so that the hour hand 243 and the minute hand 244 can be piled up.

If an execution screen of a schedule application is outputted, the controller 180 can detect positions of objects included in the execution screen of the schedule application. According to the example shown in FIG. 11C, a text 1140 indicating a date is displayed between 11 o'clock and 1 o'clock and a text 1150 indicating the day of the week is displayed between 5 o'clock and 7 o'clock. Hence, the controller 180 can control the hour hand 243 and the minute hand 244 to be located outside the 11 to 1 o'clock region and the 5 to 7 o'clock region. As mentioned in the foregoing description, the controller 180 can move the hour hand 243 and the minute hand 244 to the same position so that the hour hand 243 and the minute hand 244 can be piled up.

Meanwhile, the hour hand and the minute hand can be used to display progressive status information such as a progressive play rate of a content, an achieved level of a target exercise amount and the like.

For instance, FIGS. 12A, 12B, 13A and 13B are diagrams for examples of displaying a progressive status information through an hour hand and a minute hand.

Figure 12A:
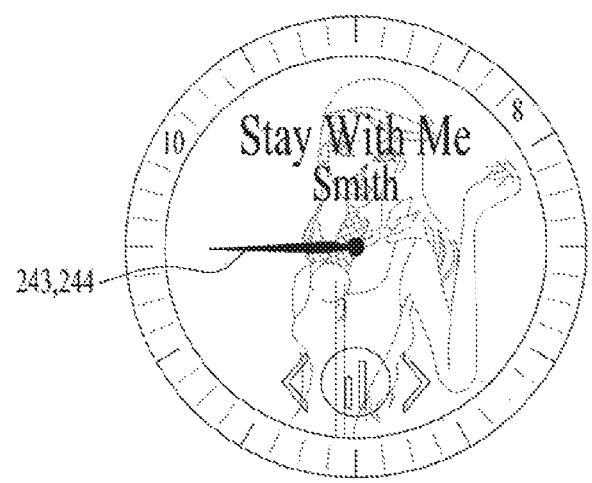
FIGS. 12A, 12B, 13A and 13B are diagrams for examples of displaying a progressive status information through an hour hand and a minute hand.
Figure 12B:
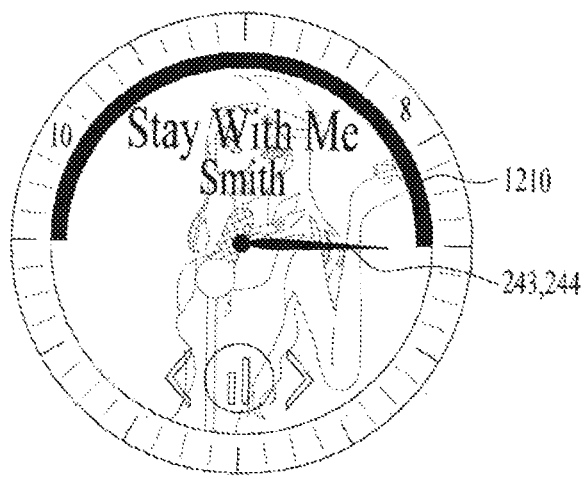

In particular, FIGS. 12A and 12B are diagrams for one example when an execution screen of a music application is outputted. Referring to FIG. 12A, if an execution screen of a music application is outputted, the controller 180 can adjust positions of the hour hand 243 and the minute hand 244 not to block an object included in the execution screen of the music application.

In doing so, the controller 180 can control at least one of the hour hand 243 and the minute hand 244 to move in a clockwise (or counterclockwise) direction according to an extent of a played music by taking the positions of the hour hand 243 and the minute hand 244 as start points. For instance, if a single rotation of at least one of the hour hand 243 and the minute hand 244 in the clockwise (or counterclockwise) direction corresponds to a play of 100% of a music file, the controller 180 can adjust a position of at least one of the hour hand 243 and the minute hand 244 in accordance with a progressive rate of the music play. For instance, if 50% of the music file is played, at least one of the hour hand 243 and the minute hand 244 can rotate by 1/2 of a circle. For instance, FIG. 12A and FIG. 12B show a state that the hour hand 243 and the minute hand 244 rotated to 3 o'clock by taking 9 o'clock as a start point. Since the hour hand 243 and the minute hand 244 rotated by 1/2 turn, it can be determined that a timing point corresponding to 1/2 of a total play section of the music file is currently played. According to the example shown in FIG. 12A and FIG. 12B, if the hour hand 243 and the minute hand 244 are rotated simultaneously while the hour hand 243 and the minute hand 244 are piled up, it may be able to minimize an area in which the hour hand 243 and the minute hand 244 block the application execution screen.

Moreover, the controller 180 can control a moving trace of at least one of application execution screen to be displayed in a manner of being visually identifiable. According to the example shown in FIG. 12B, an image 1210 in a strap shape is outputted along the moving trace of the hour hand 243 and the minute hand 244.

If at least one of the hour hand 243 and the minute hand 244 rotates, the controller 180 can change a play timing point of the music file in accordance with a movement of at least one of the hour hand 243 and the minute hand 244. In doing so, a rotation of at least one of the hour hand 243 and the minute hand 244 in a first direction (e.g., a clockwise direction, a counterclockwise direction, etc.) is to move a play timing point of the music file forward. On the other hand, a rotation of at least one of the hour hand 243 and the minute hand 244 in a second direction opposite (e.g., a counterclockwise direction, a clockwise direction, etc.) to the first direction is to move a play timing point of the music file backward.

According to the example shown in FIGS. 12A and 12B, a circumference of the circle corresponds to a total play section of a currently played music file. And, the position of the hour and minute hands indicates a play timing point of the music file. Unlike the example shown in the drawing, the controller outputs a gauge bar indicating a total play section of the music file to an edge of the display unit 151 and is also able to control a gauge of the gauge bar to increase according to the movements of the hour and minute hands.

One example of displaying a progressive status information through a gauge bar is described in detail with reference to FIGS. 13A and 13B as follows.

Figure 13A:
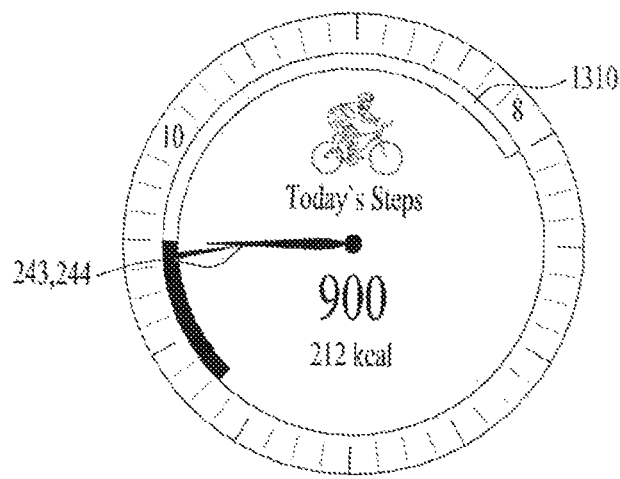
Figure 13B:
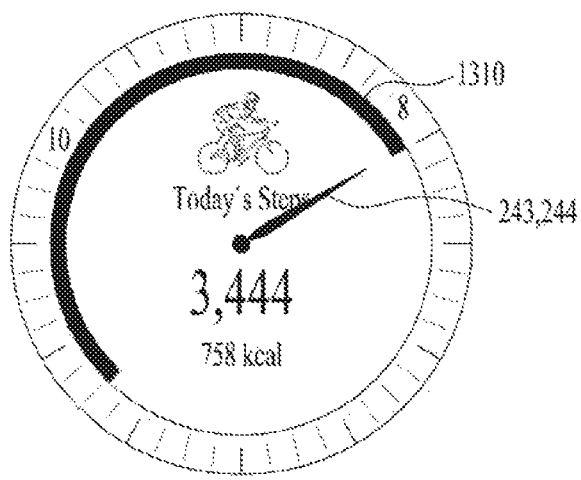

FIGS. 13A and 13B are diagrams for one example when an execution screen of an exercise application is outputted. If the exercise application is run, the controller 180 can output a gauge bar 1310 according to a target exercise amount set by a user. In this case, the target exercise amount may be set to a calorie consumption quantity, the number of steps, a jogging distance, or the like.

According to the example shown in FIG. 13A, the gauge bar 1310 is outputted along an edge of the display unit 151 (particularly, a dial region).

In doing so, the controller 180 can control at least one of the hour hand 243 and the minute hand 244 to point to an achieved rate of the set target exercise amount. For example, if a user achieves 20% of the target exercise amount, as shown in FIG. 13A, the controller 180 can control the hour hand 243 and the minute hand 244 to point to 20% of the gauge bar 1310.

As a user's exercise amount increases, if the achieved rate rises, referring to FIG. 13B, the controller 180 can control the gauge indicated by the hour hand 243 and the minute hand 244 to further increase.

Like the example shown in FIG. 13A and FIG. 13B, if the hour hand 243 and the minute hand 244 are simultaneously rotated while piled up, it may be able to minimize an area in which the hour hand 243 and the minute hand 244 block the application execution screen.

According to the examples shown in FIGS. 12A, 12B, 13A and 13B, at least one of the hour hand and the minute hand points to a progressive play status of a playable content (e.g., music, video, etc.) or an achieved rate of a target exercise amount. Furthermore, the controller 180 may display various progressive statuses of a file transmission rate, an progressive upgrade rate, a battery level and the like through the hour hand and the minute hand.

The controller 180 may display progressive statuses of a plurality of items using an hour hand and a minute hand. For instance, the hour hand displays a progressive status of one item, while the minute hand displays a progressive status of another item. If 2 gauge bars are outputted through the display unit 151, the hour hand may be used to point to a progressive rate of one of the two gauge bars and the minute hand may be used to point to a progressive rate of the other.

According to the examples mentioned in the above description, when an application execution screen is outputted, an hour hand and a minute hand may move to positions not to block an object included in the application execution screen or may be used to display an achieved rate on the application execution screen.

For another instance, after an application execution screen has been outputted, the controller 180 enables an hour hand and a minute hand to point to a current time and is also able to dispose an object on the application execution screen to avoid positions of the hour and minute hands.

Figure 14A:
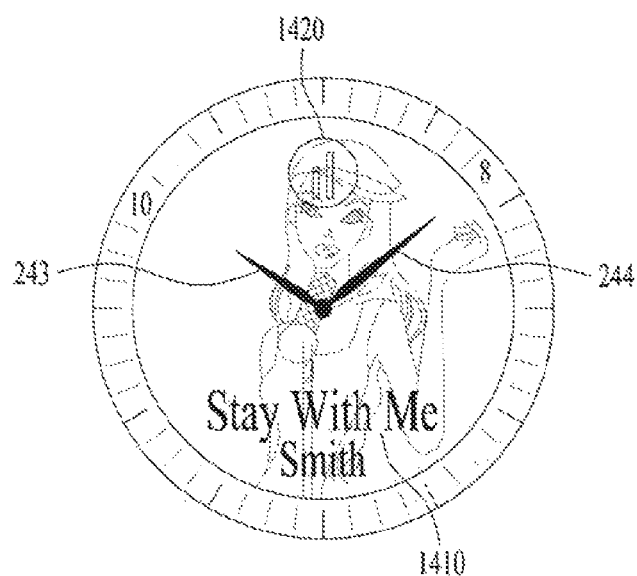
FIGS. 14A and 14B are diagrams for one example of disposing an object by avoiding positions of hour and minute hands.
Figure 14B:
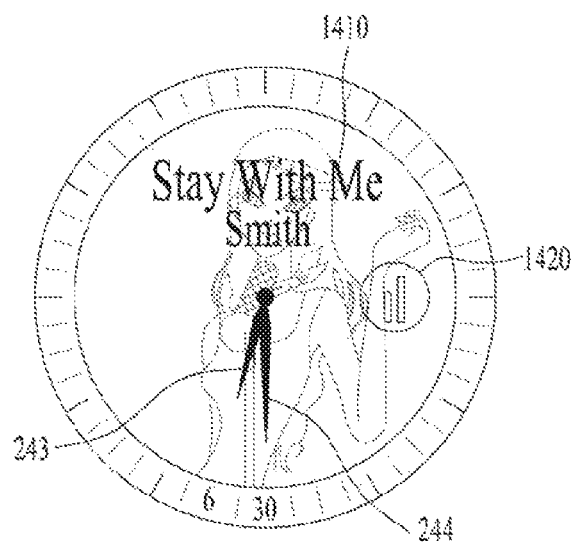

For instance, FIGS. 14A and 14B are diagrams for one example of disposing an object by avoiding positions of hour and minute hands.

Referring to FIG. 14A, if a current time is 10 o'clock and 8 minutes, the hour hand 243 is located in 10 to 11 o'clock region and the minute hand 244 can be located in 1 to 2 o'clock region. In this case, the controller 180 can control an object included in an application execution screen to be disposed outside the 10 to 11 o'clock region and the 1 to 2 o'clock region.

For example, assuming that an execution screen of a music application is outputted, as shown in FIG. 14A, the controller 180 can dispose a text 1410 indicating a song title and a singer name and a button 1420 for controlling a music play to be disposed not to block the 10 to 11 o'clock region and the 1 to 2 o'clock region.

If a current time is 6 o'clock 30 minutes, since the hour hand 243 is situated in 6 to 7 o'clock region and the minute hand 24 points to 6 o'clock, referring to FIG. 14B, the controller 180 may be able to dispose the text 1410 and the button 1420 not to block the 6 to 7 o'clock region.

Besides, when a watch face scene (or screen) is outputted, the controller 180 may dispose a widget not to block an hour hand and a minute hand [not shown in the drawing].

If an output of an application execution screen is ended, the controller 180 re-outputs a watch face screen and is also able to control an hour hand and a minute hand to point to a current time again. In case of receiving a user input for requesting an end of an application or a user input for switching an application to a background state, ending an application in a main device, switching an application to a background state, or the like, the controller 180 can end the output of the application execution screen.

As assumed in the foregoing description, the aforementioned embodiments are applicable to a watch type terminal configured to output hands of a digital image type as well as to a watch type terminal including physical hands.

Besides, when the hands are outputted in digital image shape, when an application execution screen is outputted, the controller 180 may stop outputting the hands. As the output of the hands is stopped, it may be able to prevent the hands from blocking an object included in the application execution screen. Although the output of the hands is stopped, a user may be ware of a current time through a time information outputted through an edge region.

Accordingly, embodiments of the present invention provide various effects and/or features.

First of all, the present invention provides a mobile terminal and controlling method thereof, by which user's convenience can be enhanced.

In particular, the present invention provides a mobile terminal and controlling method thereof, by which an hour hand and a minute hand can be re-disposed to prevent the hour and minute hands from blocking an object contained in an application execution screen.

Moreover, the present invention provides a mobile terminal and controlling method thereof, by which a progressive status of a prescribed item can be represented using an hour hand and a minute hand.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A watch type mobile terminal in which time is indicated by at least one hand, the mobile terminal comprising:
   a display; and
   a controller configured to:
      cause the display to display a face screen;
      cause the at least one hand to point to a current time while the face screen is displayed;
      cause the display to display an execution screen of an application when the application is executed;
      cause the at least one hand to move from a first position to a second position, deviating from the current time, to not block an area of the execution screen at which an object is displayed;
      cause the display to display a gauge bar indicating a progressive status on the execution screen; and
      cause the at least one hand to point to a position corresponding to a progressive rate of the gauge bar.

2. The mobile terminal of claim 1, wherein:
   the face screen comprises a dial region for displaying an index object at a position corresponding to at least one of an hour or a minute and an edge region surrounding the dial region; and
   the controller is further configured to cause the display to display numerals corresponding to the current time via the edge region.

3. The mobile terminal of claim 2, wherein the controller is further configured to cause the display to stop the displaying of the dial region when the execution screen is displayed while the displaying of the edge region is maintained when the execution screen is displayed.

4. The mobile terminal of claim 2, wherein:
   the at least one hand comprises an hour hand and a minute hand; and
   the numerals displayed via the edge region comprise a first numeral corresponding to hour-unit information indicated by the hour hand and a second numeral corresponding to minute-unit information indicated by the minute hand.

5. The mobile terminal of claim 4, wherein the first numeral and the second numeral are displayed distinguishably from each other by being displayed differently in at least one of their font types, colors, or sizes.

6. The mobile terminal of claim 1, wherein the gauge bar indicates a progression of multimedia content being played or an achieved rate of a target exercise amount.

7. The mobile terminal of claim 1, wherein the controller is further configured to cause the display to display a widget via the face screen such that a different widget is displayed based on a place at which the mobile terminal is located.

8. The mobile terminal of claim 7, wherein the controller is further configured to cause the display to:
   display a first widget when the mobile terminal is located at a first place; and
   display a second widget when the mobile terminal is relocated from the first place to a second place.

9. The mobile terminal of claim 1, wherein:
   the at least one hand comprises an hour hand and a minute hand; and
   when the execution screen is displayed, the controller is further configured to cause the hour hand and the minute hand to be re-directed to overlap each other.

10. The mobile terminal of claim 1, further comprising a touch sensor configured to receive a touch input, wherein the controller is further configured to adjust a position of the at least one hand in response to the touch input.

11. The mobile terminal of claim 1, wherein the controller is further configured to cause the at least one hand to re-point to a position corresponding to the current time when the execution of the application is stopped.

12. The mobile terminal of claim 11, wherein the controller is further configured to cause the display to re-display the face screen when the execution of the application is stopped.

13. The mobile terminal of claim 1, further comprising the at least one hand as a physical hand.

14. The mobile terminal of claim 1, wherein the controller is further configured to cause the display to display the at least one hand.

15. A method for controlling a watch type mobile terminal in which time is indicated by at least one hand, the method comprising:
   displaying a face screen:
   causing the at least one hand to point to a current time while the face screen is displayed;
   executing an application and displaying an execution screen of the executed application;
   moving the at least one hand from a first position to a second position, deviating from the current time, to not block an area of the execution screen at which an object is displayed;
   displaying a gauge bar indicating a progressive status on the execution screen; and
   causing the at least one hand to point to a position corresponding to a progressive rate of the gauge bar.

16. The method of claim 15, wherein:
- the face screen comprises a dial region for displaying an index object at a position corresponding to at least one of an hour or a minute and an edge region surrounding the dial region; and
- the method further comprises displaying numerals corresponding to the current time via the edge region.

17. The method of claim 16, further comprising stopping the displaying of the dial region when the execution screen is displayed while the displaying of the edge region is maintained when the execution screen is displayed.

18. The method of claim 15, further comprising:
- displaying a gauge bar indicating a progressive status on the execution screen; and
- causing the at least one hand to point to a position corresponding to a progressive rate of the gauge bar.

19. The method of claim 15, further comprising:
- stopping the execution of the application in response to an input;
- re-displaying the face screen; and
- causing the at least one hand to re-point to a position corresponding to the current time.

* * * * *